US012463369B2

(12) United States Patent
Brennan et al.

(10) Patent No.: US 12,463,369 B2
(45) Date of Patent: Nov. 4, 2025

(54) ELECTRICAL CONNECTOR WITH REMOVABLE LOAD BAR

(71) Applicant: Sentinel Connector Systems, Inc., York, PA (US)

(72) Inventors: Robert Brennan, York, PA (US); Randy Schwartz, York, PA (US)

(73) Assignee: SENTINEL CONNECTOR SYSTEMS, INC, York, PA (US)

( * ) Notice: Subject to any disclaimer, the term of this patent is extended or adjusted under 35 U.S.C. 154(b) by 403 days.

(21) Appl. No.: 17/579,725

(22) Filed: Jan. 20, 2022

(65) Prior Publication Data

US 2022/0302629 A1 Sep. 22, 2022

Related U.S. Application Data

(63) Continuation-in-part of application No. 17/202,536, filed on Mar. 16, 2021, now Pat. No. 11,594,836.

(51) Int. Cl.

| | |
|---|---|
| ***H01R 13/502*** | (2006.01) |
| ***H01R 24/64*** | (2011.01) |
| ***H01R 43/18*** | (2006.01) |

(52) U.S. Cl.

CPC ........... *H01R 13/502* (2013.01); *H01R 24/64* (2013.01); *H01R 43/18* (2013.01)

(58) Field of Classification Search

CPC ...... H01R 13/502; H01R 24/64; H01R 43/18; H01R 4/2433

See application file for complete search history.

(56) References Cited

U.S. PATENT DOCUMENTS

| | | | | |
|---|---|---|---|---|
| 7,048,572 B1 * | 5/2006 | Ting | H01R 4/2404 439/418 |
| 8,057,261 B1 * | 11/2011 | DeSio | H01R 13/506 439/694 |
| 8,480,438 B2 * | 7/2013 | Mattson | H01R 13/66 439/676 |
| 10,811,831 B1 * | 10/2020 | Wu | H01R 24/64 |

* cited by examiner

*Primary Examiner* — Briggitte R. Hammond

(74) *Attorney, Agent, or Firm* — KCO Legal, INC

(57) ABSTRACT

A modular plug system including a plug housing including a top surface, bottom surface and two opposing side surfaces, a front end having a cavity formed in the front end and an opening opposite the front end, and a cavity extending from the front end to the opening in the back end, and a cap unit that is inserted into the front end such that a surface of the front end is co-planer with the front surface of the cap unit, where the cavity has a back surface that is recessed from the front surface of the plug.

16 Claims, 12 Drawing Sheets

ELECTRICAL CONNECTOR WITH REMOVABLE LOAD BAR

CROSS-REFERENCE TO RELATED APPLICATIONS

This is application is a continuation in part of U.S. application Ser. No. 17/202,536 filed Mar. 16, 2021 entitled "ELECTRICAL CONNECTOR WITH REMOVABLE LOAD BAR."

BACKGROUND OF THE PRESENT INVENTION

As more and more devices incorporate network connectivity, termination of network connectors takes place outside a closed environment on a more regular basis. Terminating a connector in the field raises many issues including poor connectivity resulting from improper insertion of wires into modular connectors. Improper terminations can lead to degraded device performance or device failure. With a traditional modular plug, wires are hand cut to a length that will allow the wires to engage with the crimping portion of the plug. However, many times the wires are cut inconsistent lengths such that the wire do not fully engage the crimping portion of the plug resulting in a bad connection.

A need exists for a plug that will allow for easy insertion an crimping of cables in the field.

SUMMARY OF THE PRESENT INVENTION

One embodiment of the present disclosure includes a modular plug system including a plug housing including a top surface, bottom surface and two opposing side surfaces, a front end and an opening opposite the front end, and a cavity extending from the front end to the opening in the back end, and a load bar sized to engage the cavity in the modular plug, the load bar including two extensions on an upper surface of the load bar, the extensions sized to engage two openings in the top surface of the plug housing when the load bar is inserted into the cavity.

One embodiment of the current disclosure includes a modular plug system including a plug housing including a top surface, bottom surface and two opposing side surfaces, a front end and an opening opposite the front end, and a cavity extending from the front end to the opening in the back end, a load bar sized to engage the cavity in the modular plug, the load bar including two extensions on an upper surface of the load bar, the extensions sized to engage two openings in the top surface of the plug housing when the load bar is inserted into the cavity.

Another embodiment includes a front side of each extension portion is sloped towards a front end of the load bar.

In another embodiment each extension portion is sized to prevent the load bar from exiting the cavity after the load bar is installed.

In another embodiment the load bar includes a plurality of holes sized to each accommodate a wire.

In another embodiment each hole in the load bar is sized to concentrically align with one of a plurality of holes in the front end of the modular plug.

In another embodiment the extensions push the load bar towards the bottom of the housing.

In another embodiment the front end of the housing includes a single row of openings.

In another embodiment the front end of the housing includes multiple rows of openings.

In another embodiment a wire passed through one opening in the load bar is guided to a corresponding opening in the front of the modular plug.

In another embodiment the top of the extension portion is coplaner with the top surface of the plug.

Another embodiment includes a modular plug system including a plug housing including a top surface, bottom surface and two opposing side surfaces, a front end and an opening opposite the front end, and a cavity extending from the front end to the opening in the back end, a load bar including a guidance portion connected to a management portion that is sized to engage the cavity in the modular plug, the management portion including two extensions on an upper surface of the management portion, the extensions sized to engage two openings in the top surface of the plug housing when the load bar is inserted into the cavity.

In another embodiment a front side of each extension portion is sloped towards a front end of the load bar.

In another embodiment each extension portion is sized to prevent the load bar from exiting the cavity after the load bar is installed.

In another embodiment the guidance portion includes a plurality of holes sized to each accommodate a wire.

In another embodiment each hole in the guidance portion is sized to concentrically align with one of a plurality of holes in the front end of the modular plug.

In another embodiment the extensions push the management portion towards the bottom of the housing.

In another embodiment the front end of the housing includes a single row of openings.

In another embodiment the front end of the housing includes multiple rows of openings.

In another embodiment a wire passed through one opening in the guidance portion is guided to a corresponding opening in the front of the modular plug.

In another embodiment the top of the extension portion is coplaner with the top surface of the plug.

DRAWING SUMMARY

DETAILED DESCRIPTION

Figure 1:
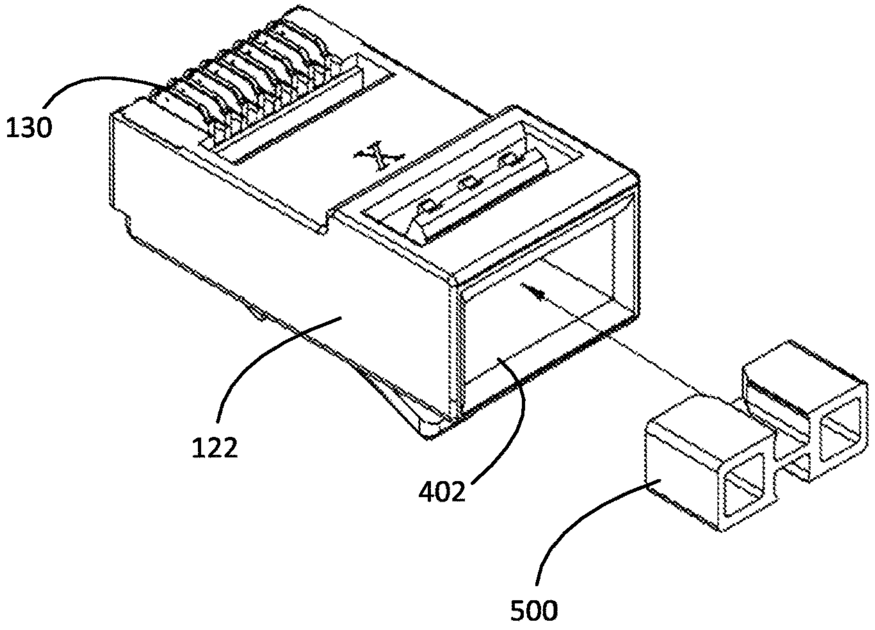
FIG. 1 depicts a perspective view of a load bar being inserted into the opening of the modified connector housing.
Figure 12:
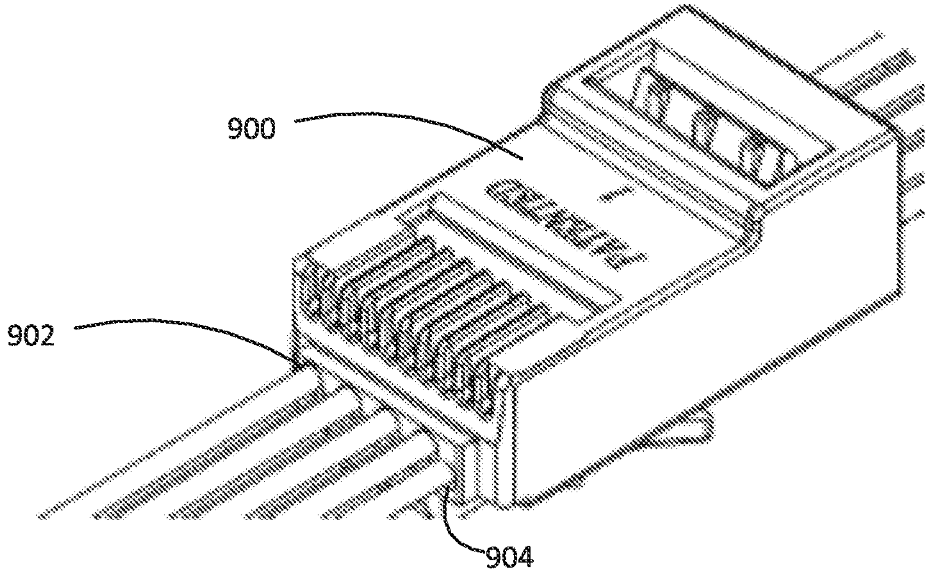
FIG. 12 depicts a cut away view of a multi row plug with a load bar inserted into the plug.

FIG. 1 depicts a perspective view of a load bar 500 being inserted into the opening of the modified connector housing 122. The modified connector housing 122 includes an opening 402. The load bar 500 is sized such that the load bar 500 can be inserted into the opening 402. FIG. 12 depicts a cut away side view of the modular connector housing 122 with the load bar 500 inserted into the opening 402. When inserted, a front surface of the load bar 500 is adjacent to a plurality of wiring channels 404. The load bar 500 is positioned in the opening 402 such that each wire of a plurality of wires inserted into the opening 402 are guided into a respective wire channel 404.

Figure 2:
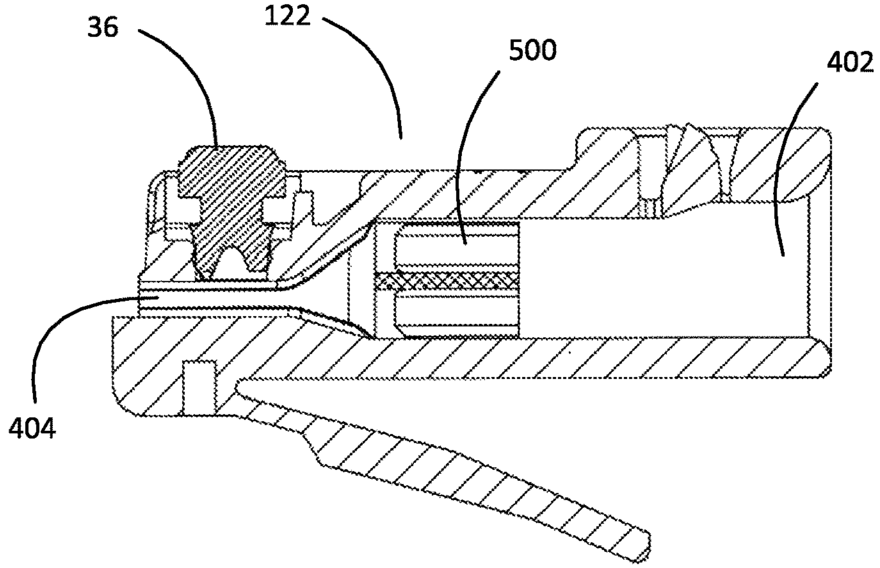
FIG. 2 depicts a rear view of the modular connector housing with the load bar inserted into the opening.

FIG. 2 depicts a rear view of the modular connector housing 122 with the load bar 500 inserted into the opening 402. The load bar 500 includes four openings 502, 504, 506 and 508. In one embodiment, the openings 402 are arranged in a single row and three of the four openings 502, 504 and 506 are arranged such that each of the openings 502, 504 and 506 align with at least two wiring channels 404. In another embodiment, the openings 402 are arranged into multiple rows and the openings 502, 504, 506 and 508 are arranged such that each opening is aligned with at least one opening 402.

Figure 3:
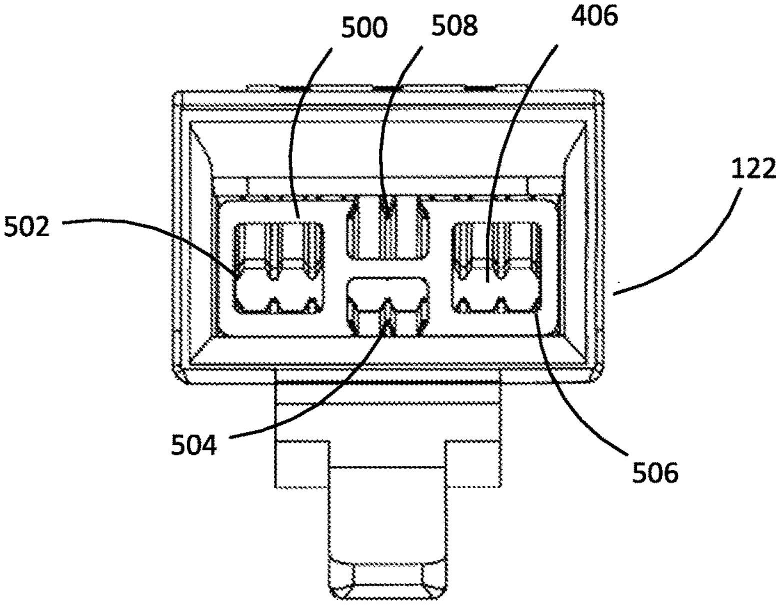
FIG. 3 depicts a perspective cut away view of the modular connector housing.
Figure 4:
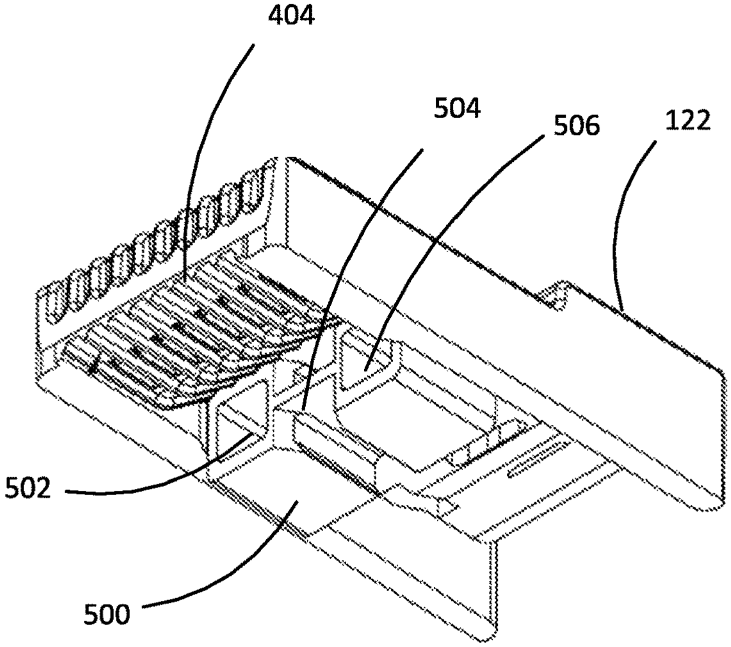
FIG. 4 depicts another perspective cut away view of the modular connector housing.
Figure 5:
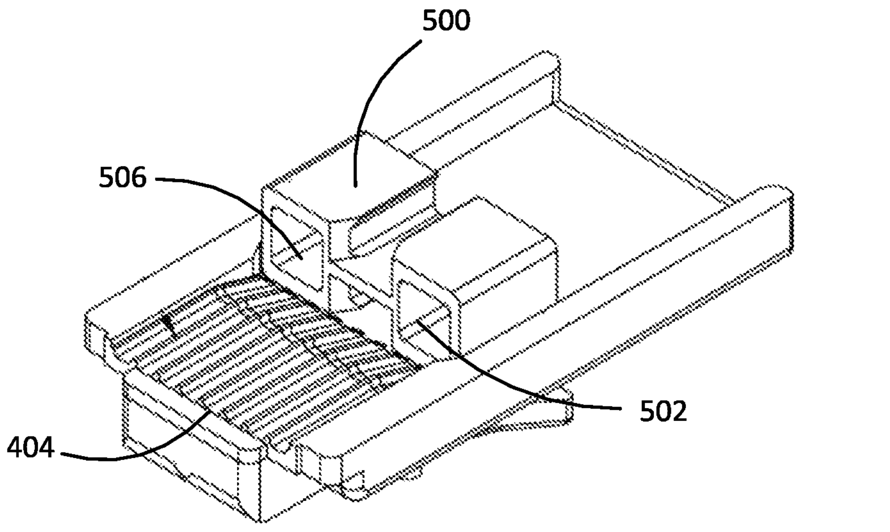
FIG. 5 depicts a cut away view of the modular connector housing.

FIG. 3 depicts a perspective cut away view of the modular connector housing. The load bar 500 is positioned adjacent to the wiring channels 402 such that wires pass through the openings 502, 504, 506 and 508 of the load bar 500 to engage the wiring channels 402. FIG. 4 depicts another perspective cut away view of the modular connector housing. FIG. 5 depicts a cut away view of the modular connector housing. The load bar 500 is positioned such that wires passing through the openings 502, 504, 506 and 508 are positioned in the wiring channels 402 such that the contact blades 36 engage each wire in each wiring channel 402 when the modular connector housing 122 is crimped.

Figure 6:
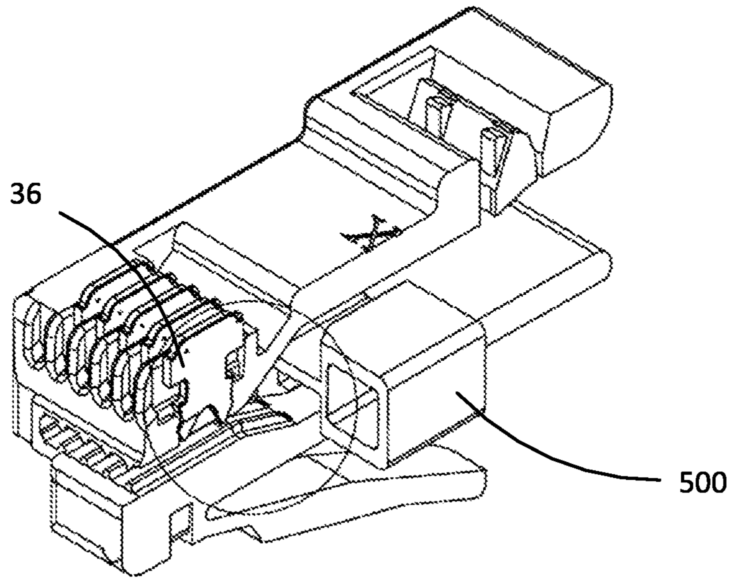
FIG. 6 depicts an embodiment of a plug and a load bar.

FIG. 6 depicts an embodiment of a plug 600 and a load bar 700. The load bar 700 includes a wire management portion and a load portion 704. The wire management portion 702 includes a plurality of wiring channels 706 that are sized to each engage a wire extending from the load portion 704. When positioned in the plug 600, each wiring channel 706 is aligned with one opening 602 in the plug 600 to allow a wire to extend outward form the opening 602. The load portion 704 includes flanges 708 and 710 that extend from a central base portion. Each flange 708 and 710 includes a locking unit 712 and 714 with the locking units 712 and 714 being positioned on the top surface of each flange 712 and 714 such that each locking portion 712 and 714 engages an opening 604 and 606 in the top surface of the plug 600.

Figure 7:
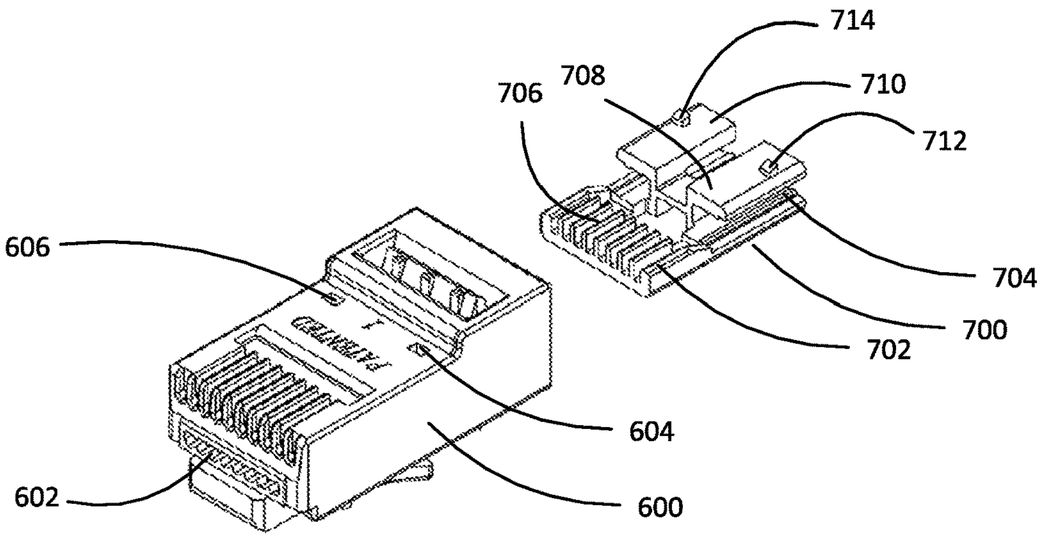
FIG. 7 depicts a cut away view of the plug and load bar.
Figure 8:
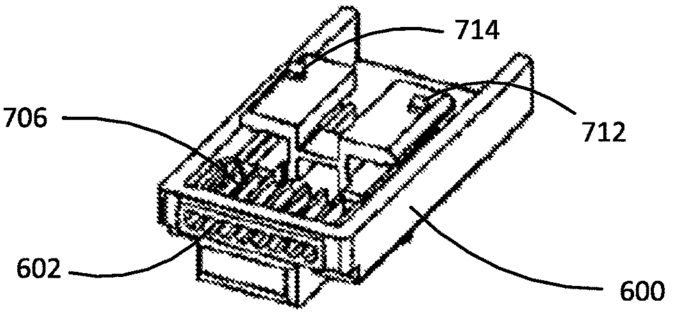
FIG. 8 depicts a cut away view of the load bar being inserted into the plug.

FIG. 7 depicts a cut away view of the plug 600 and load bar 700. The load bar 700 is sized to rest in a cavity inside the plug 600. The wire channels 706 are positioned on the load bar 700 such that each wire channel 706 is aligned with a respective opening 602. The flanges 708 and 710 are positioned such that the flanges do not interfere with the sides or top of the plug 600 and the locking units 712 and 714 are positioned such that the locking units 712 and 714 engage an opening 604 and 606 on the plug. FIG. 8 depicts a cut away view of the load bar 700 being inserted into the plug. In one embodiment, the lower inner surface of the plug includes a step down portion 608 to accommodate larger cables.

Figure 9:
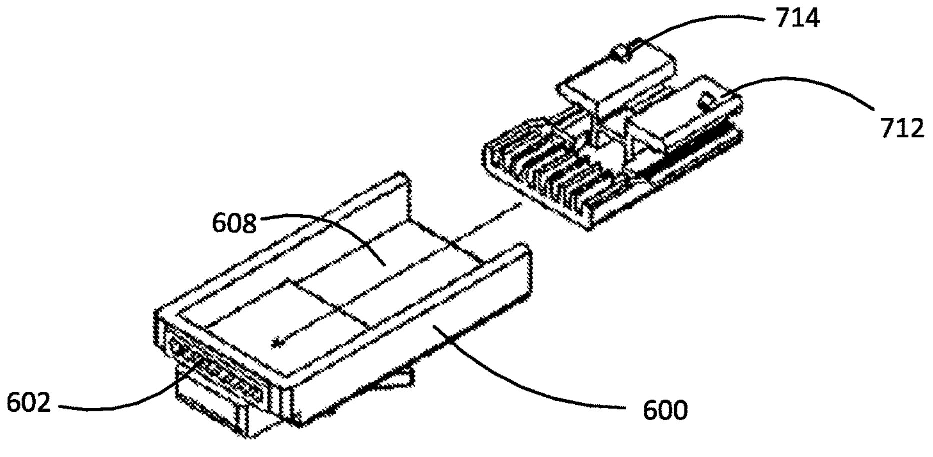
FIG. 9 depicts a partial cut away view of the plug and load bar.
Figure 10:
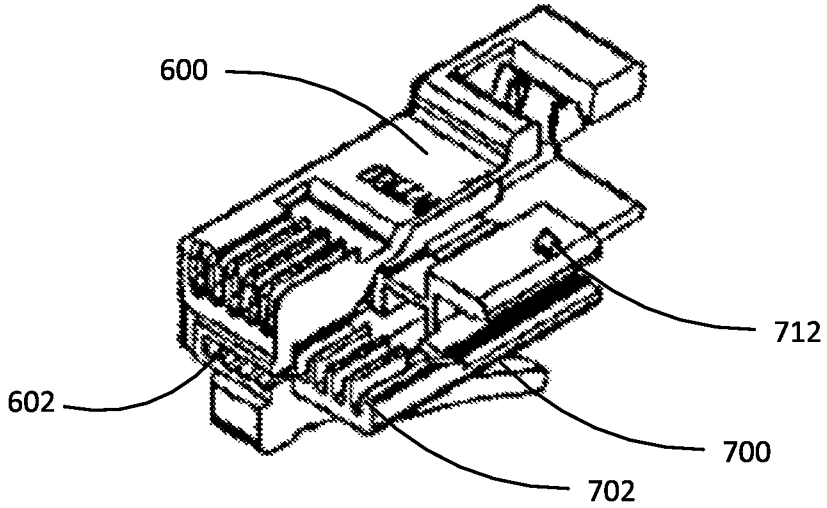
FIG. 10 depicts a close up view of the locking unit.

FIG. 9 depicts a partial cut away view of the plug 600 and load bar 700. When inserted into the plug, the flanges 708 and 710 bend as the locking units 712 and 714 come into contact with the upper inner surface of the plug 600. The flanges 708 and 710 move upward as the locking units 712 and 714 engage the openings 604 and 606. FIG. 10 depicts a close up view of the locking unit 712. Each locking unit 712 and 714 has a top surface 800 that slopes towards the openings 602 in the plug 600. The locking units 712 and 714 include a front wall 802 and a back wall (not shown) that extend from the flange 708 or 710. When the top surface 800 comes into contact with an inner surface of the plug 600, the sloped surface 800 deflects the flange 708 or 710 down to allow the locking unit 712 and 714 to engage the openings 604 and 606.

Figure 11:
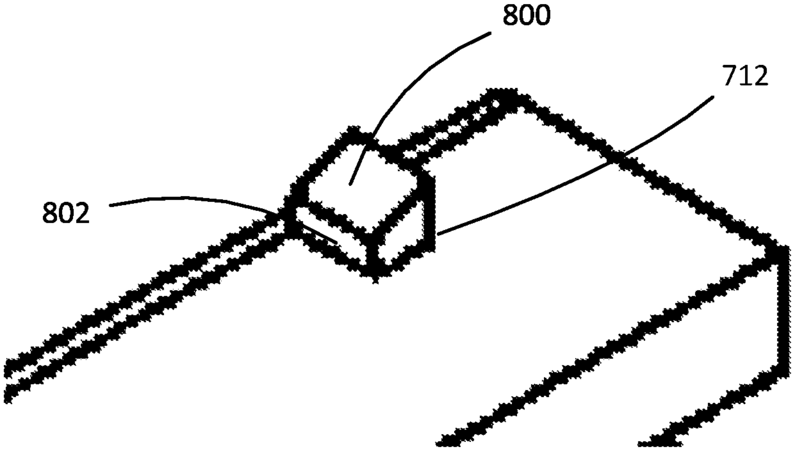
FIG. 11 depicts a perspective view of a multi row plug.

FIG. 11 depicts a perspective view of a multi row plug 900. The plug 900 includes a first row 902 of openings and a second row 904 of openings. In one embodiment, the plug includes more than two rows of openings. The openings may be concentrically aligned or staggered. Each of the openings is configured to align with a channel in the load bar (not shown) such that wires extending through each channel in the load bar (not shown) extend through a respective opening in the first row 902 or second row 904 of openings. FIG. 12 depicts a cut away view of a multi row plug 1000 with a load bar 1002 inserted into the plug 1000. The load bar includes a first row of openings 1004 and a second row of openings 1006. The openings 1004 and 1006 in the load bar 1002 are aligned with openings in a first row 902 and second row of the plug 1000 such that each wire that extends through an opening 1004 and 1006 in the load bar 1002 extends through a respective opening in the plug 1000.

Figure 13:
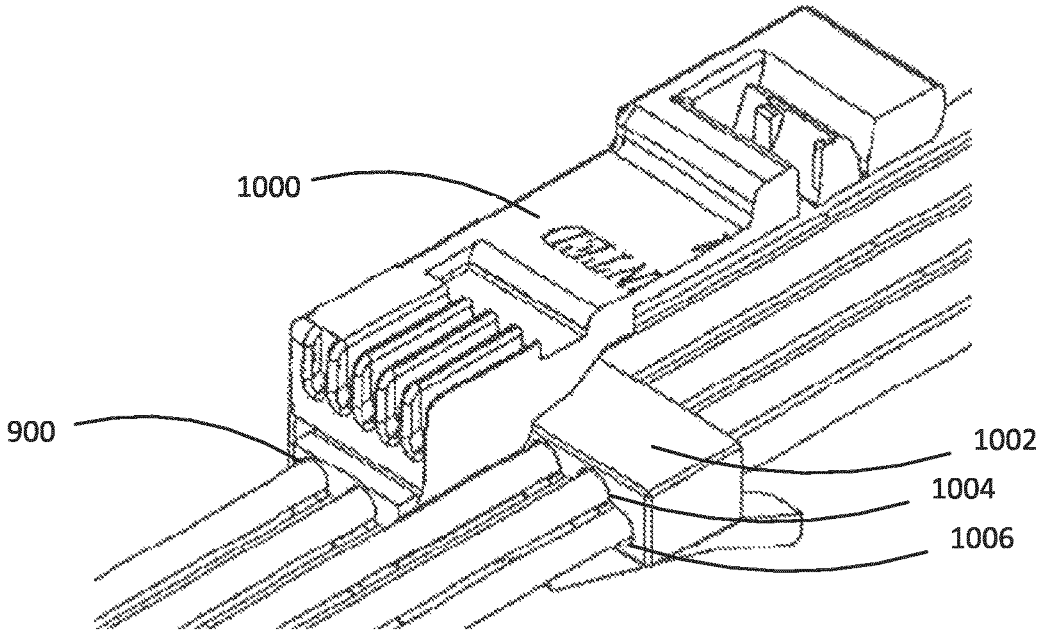
FIG. 13 depicts another embodiment of a multi row plug.
Figure 14:
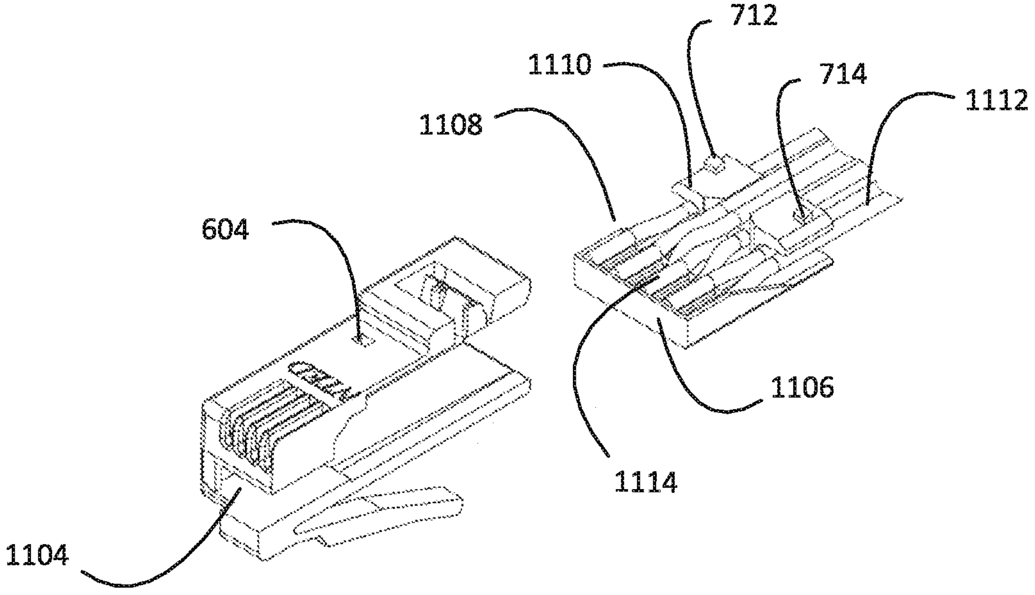
FIG. 14 shows a breakaway view of the plug and load bar.

FIG. 13 depicts another embodiment of a multi row plug 1100. The plug 1100 includes openings 602 and 604 to engage the load bar, a front surface 1102, and an opening 1104 in the lower portion of the front surface. The opening 1104 is configured to accommodate the front surface of a load bar 1106 inserted into the plug 1100. FIG. 14 shows a breakaway view of the plug 1100 and load bar 1108. The plug 1100 has an opening 1104 in the front surface that extends through the length of the plug 900. The load bar 1108 includes the front surface 1106, a wire support structure 1110, two locking units 712 and 714 on a top surface of the wire support structure 1110. A plurality of wires 1112 pass through the support structure 1110 with each wire 1112 exiting the support structure and engaging one of a plurality of channels 1114 in the front portion of the load bar 1108. The wires 1112 are cut to a length such that the front surface of each wire 1112 extends to the back of the front surface 1106 of the load bar 1108.

Figure 15:
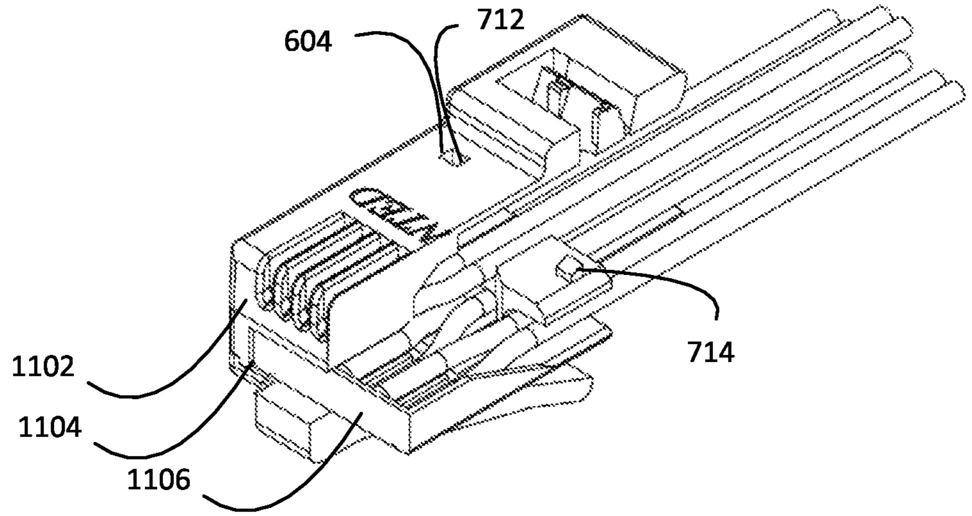
FIG. 15 depicts a cut away view of the plug with the load bar inserted into the plug.
Figure 16:
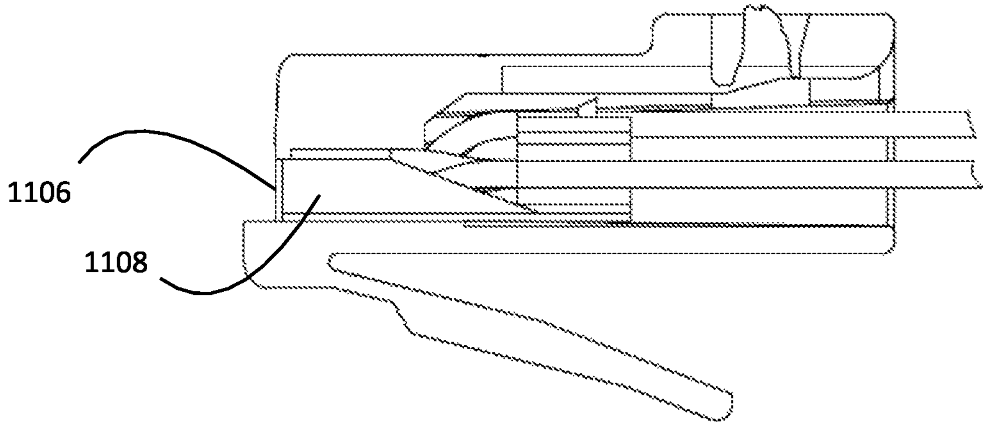
FIG. 16 depicts a side cut away view of the plug showing the front surface of the load bar being co-plainer with the front surface of the plug.
Figure 17:
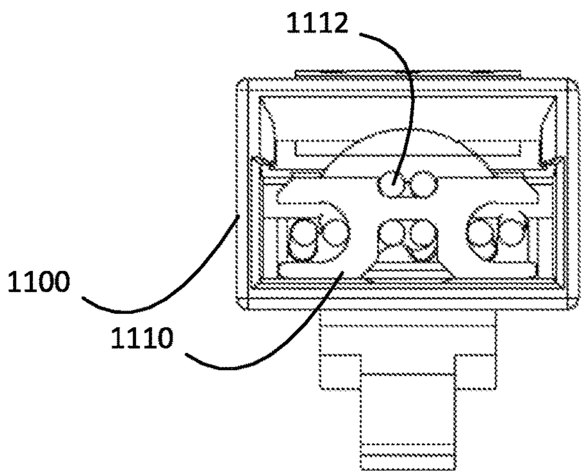
FIG. 17 shows the arrangement of wires in the load bar.

FIG. 15 depicts a cut away view of the plug 1100 with the load bar 1108 inserted into the plug 1100. The front surface 1106 of the load bar 1108 is co-planer with the front surface 1102 of the plug 1100 such that the front surface 1106 of the load bar 1108 acts to fill the opening 1104 in the plug 1100. FIG. 16 depicts a side cut away view of the plug 1100 showing the front surface 1106 of the load bar 1108 being co-plainer with the front surface 1102 of the plug 1100. FIG. 17 shows the arrangement of wires 1112 in the load bar 1108. The wires 1112 are separated into two levels with two wires 1112 being positioned in different portions of the support structure 1110. Each wire exiting the load bar enters into a channel 1114 in the load bar 1108. In one embodiment, the channels 1114 are arranged in a multi row configuration. In another embodiment, the channels 1114 are arranged in a single row.

Figure 18:
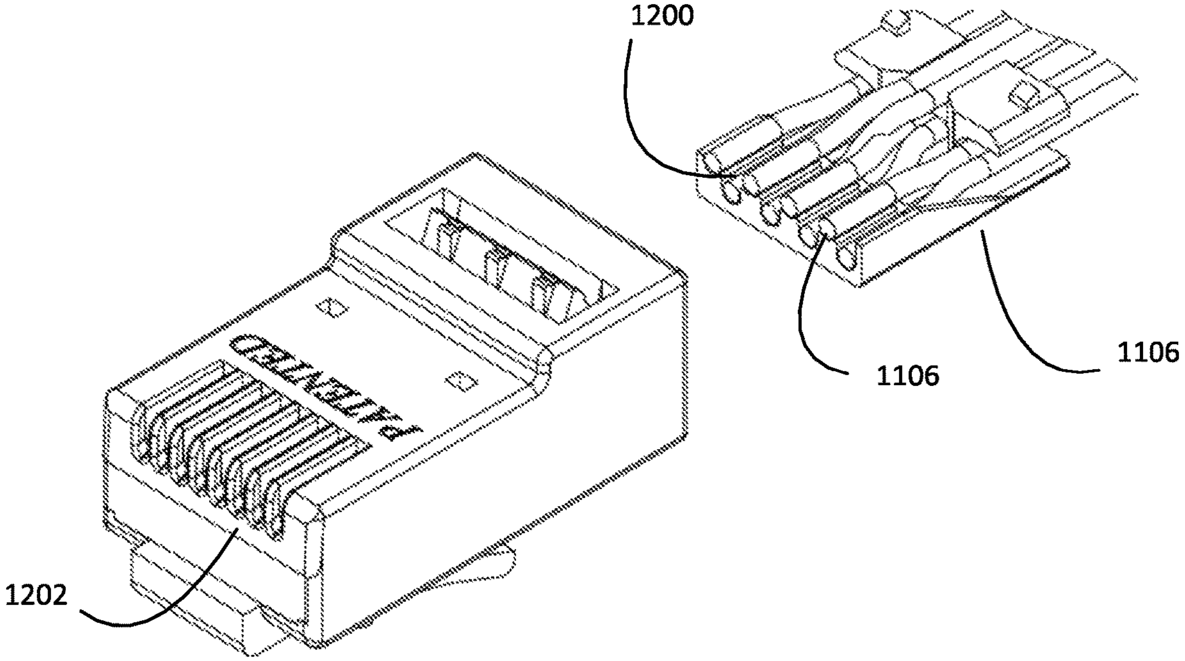
FIG. 18 shows another embodiment of the plug.

FIG. 18 shows another embodiment of the plug 1100. The load bar 1108 includes a plurality of openings 1202 through the front surface 1106 that allow the wires 1112 to pass through the openings 1200. In one embodiment, the load bar 1108 is configured to engage a cutting surface on a tool the cuts the wires such that the ends of the wires are co-planer with the front surface 1106. In another embodiment, the load bar 1108 is inserted into the plug 1110 such that the wires extend from the front surface 1102 of the plug 1100. In one embodiment, the modular plug 1100 is configured to engage a tool that cuts the wires such that the front ends of the wires are co-planer with the front surface 1102. In one embodiment, a plastic cap 1202 us placed in the opening 1104 after the load bar 1108 is inserted into the plug 1100.

Figure 19A:
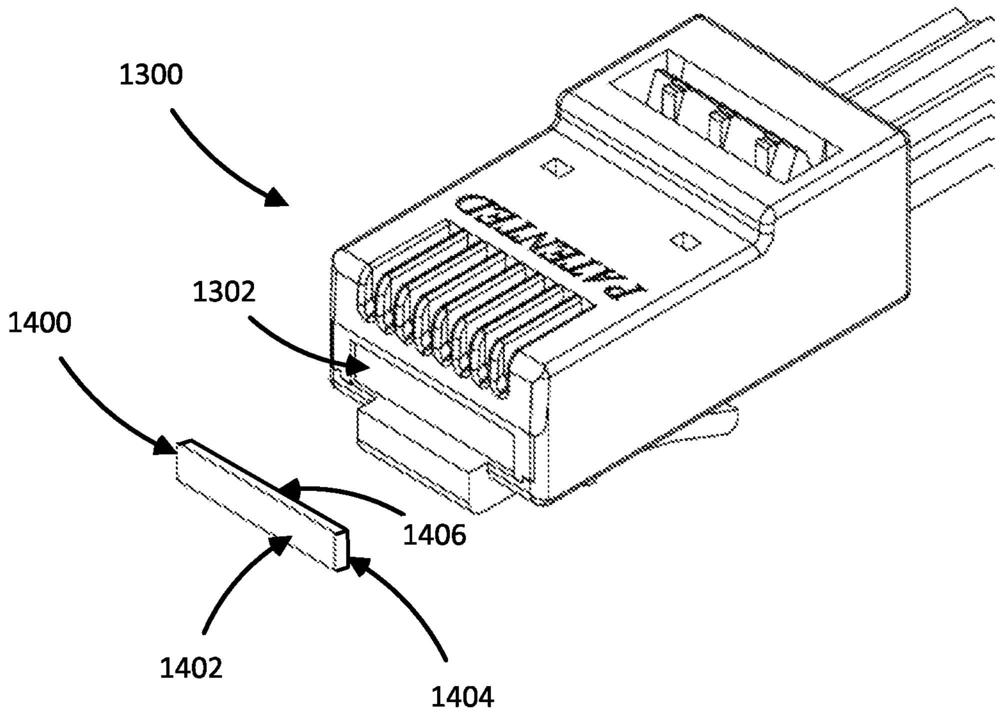
FIG. 19A depicts a perspective view of a plug and a cap unit.
Figure 19B:
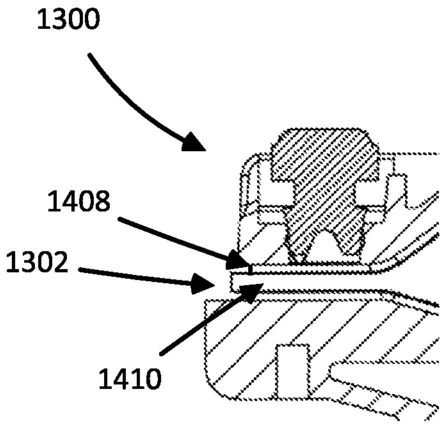
FIG. 19B depicts a close up view of the cavity.
Figure 20:
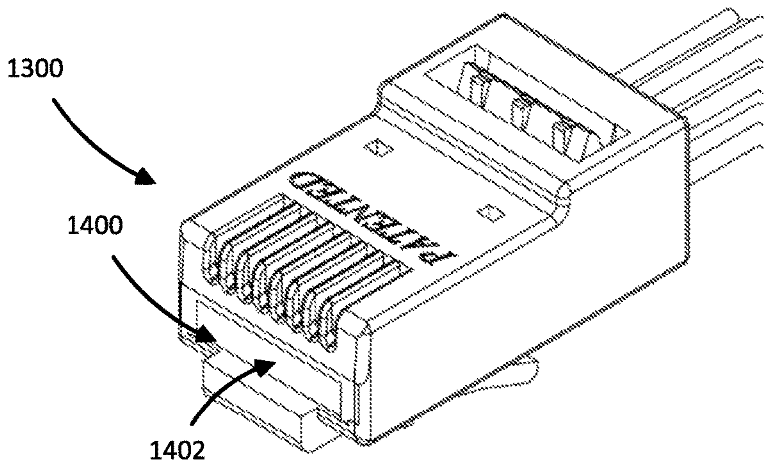
FIG. 20 depicts a perspective view of the plug with the cap unit inserted into the cavity.
Figure 21:
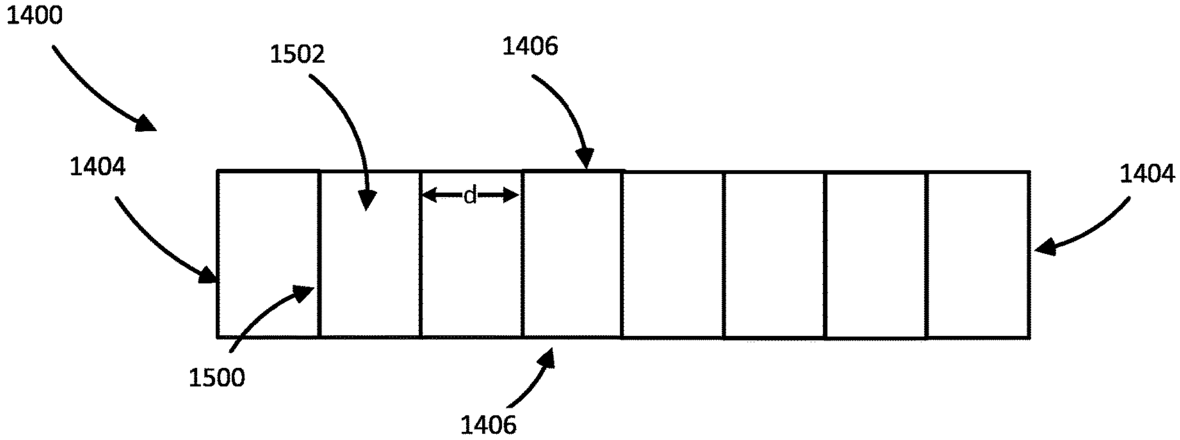
FIG. 21 depicts a back view of the cap unit.

FIG. 19A depicts a perspective view of a plug 1300 and a cap unit 1400. The plug 1300 includes an opening 1302 in the front face of the plug 1300. The opening 1302 provides access to a cavity (not shown) via plurality of channels in the back surface of the opening 1302. Each channel corresponds to a wire that passes through each channel to allow each wire to be cut from an external cutting device. A cap unit 1400 is positioned into the cavity 1302 such that a front surface 1402 of the cap unit 1400 is co-planer with the front surface of the plug 1300. The cap unit 1400 includes side surfaces 1404 and top and bottom surfaces 1406. The cap unit 1402 is made of a flame resistant material such that the cap unit 1402 prevents adjacent Power Over Ethernet wires from creating a spark. The side surfaces 1404 and top and bottom surfaces 1406 are sized to fit into the cavity 1302. The length and height of the front surface 1402 of the cap unit 1400 are sized such that the cap unit 1400 securely fits into the cavity 1302. In one embodiment, the cavity 1302 may include tabs (not shown) on the side walls of the cavity 1302 that engage openings in the side surfaces 1404 of the cavity. In another embodiment, the cap unit 1400 is sized such that the cap unit 1400 is pressure fitted into the cavity 1302. In one embodiment, a shielding case (not shown) surrounds the plug 1300 to allow a shield to be connected to the plug 1300.

FIG. 19A depicts a perspective view of a plug 1300 and a cap unit 1400. The plug 1300 includes a cavity 1302 in the front face of the plug 1300. The cavity 1302 provides access to a plurality of channels in the back surface of the opening 1302. Each channel corresponds to a wire that passes through each channel to allow each wire to be cut from an external cutting device. A cap unit 1400 is positioned into the cavity 1302 such that a front surface 1402 of the cap unit 1400 is co-planer with the front surface of the plug 1300. The cap unit 1400 includes side surfaces 1404 and top and bottom surfaces 1406. The cap unit 1402 is made of a flame resistant material such that the cap unit 1402 prevents adjacent Power Over Ethernet wires from creating a spark. The side surfaces 1404 and top and bottom surfaces 1406 are sized to fit into the cavity 1302. The length and height of the front surface 1402 of the cap unit 1400 are sized such that the cap unit 1400 securely fits into the cavity 1302. In one embodiment, the cavity 1302 may include tabs (not shown) on the side walls of the cavity 1302 that engage openings in the side surfaces 1404 of the cavity. In another embodiment, the cap unit 1400 is sized such that the cap unit 1400 is pressure fitted into the cavity 1302. In one embodiment, a shielding case (not shown) surrounds the plug 1300 to allow a shield to be connected to the plug 1300.

Figure 22:
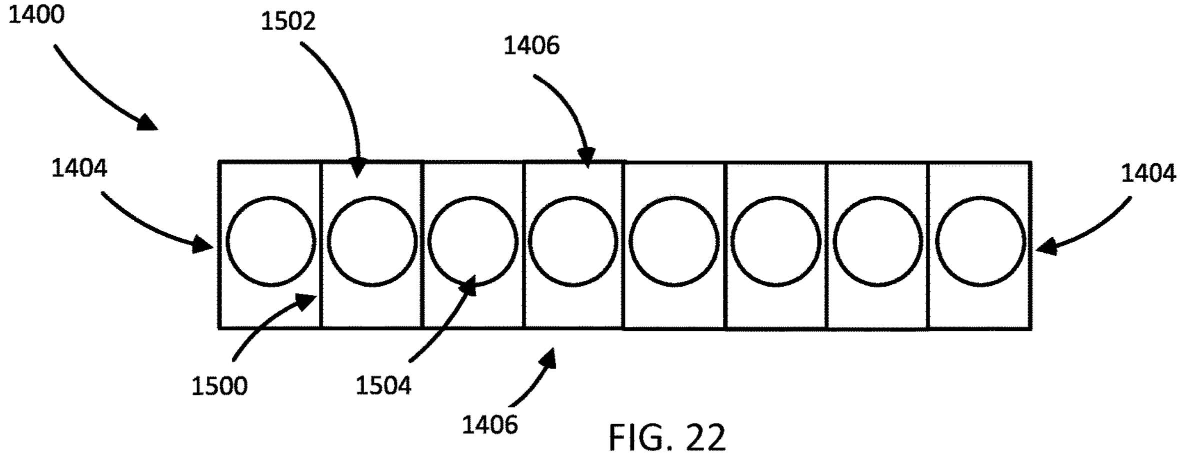
FIG. 22 depicts a back view of a cap unit.
Figure 23:
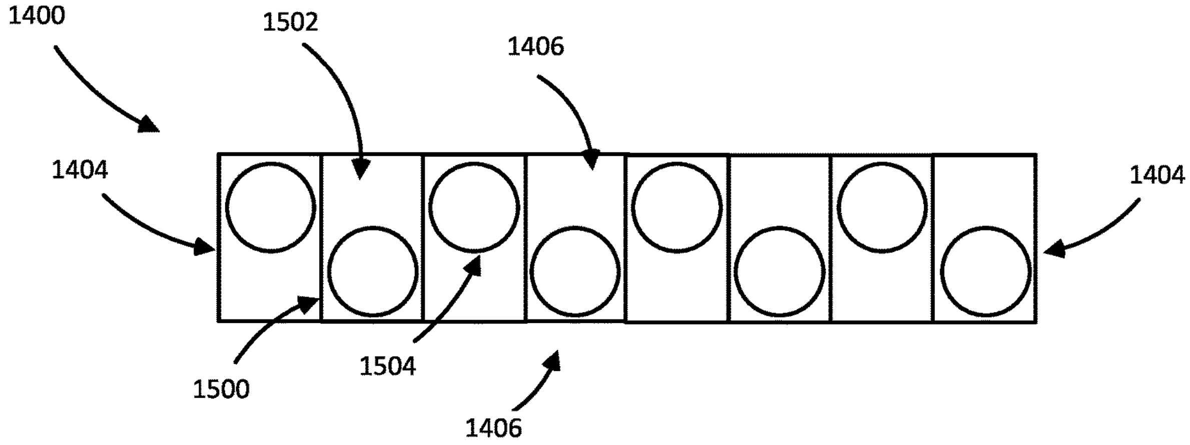
FIG. 23 depicts a back view of the cap unit including cylinder units.

FIG. 22 depicts a back view of a cap unit 1400. The cap unit 1400 includes separators 1500 and cylinder units 1504. The cylinder units 1504 are sized to accommodate a wire 1504 positioned to engage the cylinder unit 1504. In one embodiment, the depth of each cylinder unit 1504 is equal to the depth of the side walls 1404 and top and bottom walls 1406. In another embodiment, the depth of each cylinder unit 1504 is equal to the depth of the side walls 1404 and bottom walls 1406. In another embodiment, the depth of the cylinder units 1504 varies across the cap unit 1400. FIG. 23 depicts a back view of the cap unit 1400 including cylinder units 1502. Each cylinder unit 1402 is co-centrically aligned in a first row or a second row with the center of each cylinder unit 1502 being aligned with the center of a wire 1410 associated with each cylinder unit 1502. In another embodiment, the cylinder units 1502 are co-centrically aligned in a first row, second row and third row. In another embodiment, the cap unit 1402 includes two cylinder units 1502 that align with two wires in the cavity 1302.

Figure 24:
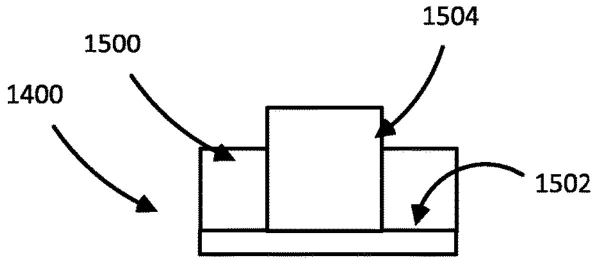
FIG. 24 depicts a side view of a cylinder unit 1502 on the cap unit

FIG. 24 depicts a side view of a cylinder unit 1502 on the cap unit 1402. Each cylinder unit 1402 extends from the back surface 1502 of the cap unit 1402 to a depth that extends above the separator 1500. When engaged, each cylinder unit 1402 engages a wire 1410 extending through the back wall of the cavity 1302 and extends into the channel in the backwall of the cavity to secure the cap unit 1402.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. A modular plug system including:

a plug housing including a top surface, bottom surface and two opposing side surfaces, a front end having a cavity formed in the front end and an opening opposite the front end, with the cavity extending from the front end to the opening in the back end;

a cap unit that is inserted into the front end such that a surface of the front end is co-planer with a front surface of the cap unit, a plurality of separators on a back side of the cap unit, where the separators are sized to accommodate a wire extending through a corresponding channel in the back surface of the cavity;

a plurality of cylinder units each extending from the back side of the cap unit with each cylinder unit being positioned between adjacent separators;

wherein, the cavity has a back surface that is recessed from the front surface of the plug.

2. The modular plug system of claim 1 wherein the cap unit is made from a flame resistant material.

3. The modular plug system of claim 1 wherein the plug is a Power over Ethernet plug.

4. The modular plug system of claim 1 wherein each cylinder unit has a depth that extends beyond the end of each separator.

5. The modular plug system of claim 1 wherein the cylinder units are arranged in a single row.

6. The modular plug system of claim 1 wherein the cylinder units are arranged in more than one row.

7. The modular plug of claim 1 wherein each cylinder is sized to engage a wire extending from a channel in the back of the cavity wall.

8. The modular plug of claim 1 wherein each cylinder unit has a depth that is the same depth as each separator.

9. A method of manufacturing a modular plug system including the steps of:

forming a plug housing including a top surface, bottom surface and two opposing side surfaces, a front end having a cavity formed in the front end and an opening opposite the front end, and forming a cavity extending from the front end to the opening in the back end;

forming a cap unit that is inserted into the front end such that a surface of the front end is co-planer with a front surface of the cap unit;

forming a plurality of separators on a back side of the cap unit, where the separators are sized to accommodate a wire extending through a corresponding channel in the back surface of the cavity;

forming a plurality of cylinder units each extending from the back side of the cap unit with each cylinder unit being positioned between adjacent separators, wherein, the cavity has a back surface that is recessed from the front surface of the plug.

10. The method of claim 9 wherein the cap unit is made from a flame resistant material.

11. The method of claim 9 wherein the plug is a Power over Ethernet plug.

12. The method of claim 9 wherein each cylinder unit has a depth that extends beyond the end of each separator.

13. The method of claim 9 wherein the cylinder units are arranged in a single row.

14. The method of claim 9 wherein the cylinder units are arranged in more than one row.

15. The method of claim 9 wherein each cylinder is sized to engage a wire extending from a channel in the back of the cavity wall.

16. The modular plug of claim 1 wherein each cylinder unit has a depth that is the same depth as each separator.

* * * * *